(12) United States Patent
Bala et al.

(10) Patent No.: US 9,764,228 B2
(45) Date of Patent: Sep. 19, 2017

(54) CONTEXTUAL PLAY PATTERN SWITCHING SYSTEM AND METHOD

(71) Applicant: Activision Publishing, Inc., Santa Monica, CA (US)

(72) Inventors: Karthik Bala, Menands, NY (US); Lee Guinchard, Santa Clara, CA (US); Jesse Booth, Menands, NY (US); Drew McCrory, Menands, NY (US)

(73) Assignee: Activision Publishing, Inc., Santa Monica, CA (US)

( * ) Notice: Subject to any disclaimer, the term of this patent is extended or adjusted under 35 U.S.C. 154(b) by 374 days.

(21) Appl. No.: 14/513,957

(22) Filed: Oct. 14, 2014

(65) Prior Publication Data

US 2015/0335997 A1 Nov. 26, 2015

Related U.S. Application Data

(63) Continuation-in-part of application No. 14/283,887, filed on May 21, 2014, now Pat. No. 9,421,463.

(51) Int. Cl.
| | |
|---|---|
| *A63F 9/00* | (2006.01) |
| *A63F 13/2145* | (2014.01) |
| *A63F 13/23* | (2014.01) |
| *A63F 13/22* | (2014.01) |
| *A63F 13/92* | (2014.01) |
| *A63F 13/98* | (2014.01) |

(52) U.S. Cl.
CPC .......... *A63F 13/2145* (2014.09); *A63F 13/22* (2014.09); *A63F 13/23* (2014.09); *A63F 13/92* (2014.09); *A63F 13/98* (2014.09)

(58) Field of Classification Search
None
See application file for complete search history.

(56) References Cited

U.S. PATENT DOCUMENTS

| | | | | |
|---|---|---|---|---|
| 5,766,077 A * | 6/1998 | Hongo | ..................... | A63F 13/02 273/148 B |
| 5,853,327 A * | 12/1998 | Gilboa | ................ | A63F 3/00643 273/237 |
| 6,773,325 B1 * | 8/2004 | Mawle | ..................... | A63F 13/02 446/175 |
| 7,081,033 B1 * | 7/2006 | Mawle | ..................... | A63F 13/02 446/175 |
| 7,843,471 B2 * | 11/2010 | Doan | ........................ | A63F 1/04 345/418 |
| 7,862,428 B2 * | 1/2011 | Borge | ..................... | A63F 13/02 463/29 |

(Continued)

*Primary Examiner* — Seng H Lim
(74) *Attorney, Agent, or Firm* — Klein, O'Neill & Singh, LLP

(57) ABSTRACT

A peripheral device for use in video gameplay includes circuitry for reading information stored in memory of toys placed on the peripheral device, and for providing that information to a computer device upon which gameplay is provided. The peripheral device includes a feature for holding a portable computer device, for example a computer tablet, in a hands free manner during gameplay. The feature may be a notch in the peripheral device, and the notch may be in a protuberance extending from a housing forming the peripheral device. In addition, the housing may provide storage for storing a game controller for use with the video game.

17 Claims, 14 Drawing Sheets

(56) References Cited

U.S. PATENT DOCUMENTS

| | | | | |
|---|---|---|---|---|
| 7,883,416 | B2* | 2/2011 | Dobrusskin | H04L 41/22 463/24 |
| 8,858,339 | B2* | 10/2014 | Reiche | A63F 13/12 446/175 |
| 8,926,395 | B2* | 1/2015 | Zheng | A63H 11/00 446/268 |
| 9,486,702 | B2* | 11/2016 | Reiche | A63F 13/12 |
| 2002/0090985 | A1* | 7/2002 | Tochner | A63F 13/12 463/1 |
| 2005/0164789 | A1* | 7/2005 | Nakamura | A63F 13/12 463/36 |
| 2009/0137280 | A1* | 5/2009 | Heikkinen | G06F 1/1624 455/566 |
| 2012/0295704 | A1* | 11/2012 | Reiche | A63F 13/06 463/31 |
| 2013/0165223 | A1* | 6/2013 | Leyland | A63F 13/02 463/30 |
| 2014/0162785 | A1* | 6/2014 | Reiche | A63F 13/12 463/35 |
| 2014/0179446 | A1* | 6/2014 | Zuniga | A63F 9/24 463/47 |
| 2014/0274373 | A1* | 9/2014 | Olshan | G06T 13/40 463/31 |
| 2015/0273337 | A1* | 10/2015 | Crowley | A63F 13/73 463/29 |
| 2016/0147404 | A1* | 5/2016 | Keune | G06F 3/0485 715/784 |

* cited by examiner

CONTEXTUAL PLAY PATTERN SWITCHING SYSTEM AND METHOD

CROSS REFERENCE TO RELATED APPLICATION

This application is a continuation-in-part of U.S. patent application Ser. No. 14/283,887, filed on May 21, 2014, the disclosure of which is incorporated by reference herein.

BACKGROUND OF THE INVENTION

The present invention relates generally to video games, and more particularly to a system and method for contextual play pattern switching.

Many enjoy play of video games, and do so using a wide variety of computer devices. Video games have long been played using computer devices such as personal computers or video game consoles connected to display devices. In playing video games with personal computers or video game consoles, players often use a personal computer keyboard, or preferably a specialized game controller, to provide user inputs for controlling a video game character or machine of the video game. Whether a keyboard or game controller is used, a plurality of different inputs may be provided, in some cases simultaneously as the player may use both hands to operate controls of the input device.

More recently, video games are being played on a variety of other devices, for example portable computer devices, such as smart phones or computer tablets or "smart" televisions (televisions or set-top boxes with integrated computer functionality, such as internet connectivity or enhanced processing capabilities). Such devices may not have input devices optimal for playing video games. Smart phones and computer tablets, for example, often use a touchscreen as an input device. For video game play, however, use of a touchscreen as the input device may detract from game play in a variety of ways. Operation of the touchscreen may block view of the display during game play. Operation of the touchscreen may also not provide multiple controls, and may not provide a tactile feel perhaps desired by players. In addition, smart phones and computer tablets are often held while in use, restricting a player's ability to simultaneously operate touchscreen controls during gameplay. Similarly, smart televisions often use input devices that are essentially television remote controls. These input devices typically do not have inputs suitable for video game play.

Complicating matters, some games utilize peripheral devices to communicatively link real world objects with the computer device providing gameplay, with the real world objects possibly providing a tangible real world component to game play. The peripheral devices may, for example, read game related information from the real world object, provide that information for use by the computer device during gameplay, and possibly store the same or different game related information in memory of the real world object. The real world objects may be, for example, toys, which may include circuitry for communicating with the peripheral device when in close proximity to that device. Player manipulation of the toys, for example placing them near or taking them away from the peripheral device, may be difficult if the player desires to do so while holding a portable computer device, and possibly also attempting to operate a touchscreen control. Moreover, in some instances the peripheral device may also provide visual and aural accompaniments to game play, accompaniments that may be of lesser effect if close spatial relation between the peripheral device and the portable computer device is not maintained.

BRIEF SUMMARY OF THE INVENTION

Aspects of the invention relate to a method for executing a video game on a portable computing device, said video game providing touchscreen-based inputs to the player, the method comprising: determining, by the computing device, the presence of an external input controller; connecting, by the computing device, to the external input controller; enabling, by the computing device, a first usage mode of the video game in response to determining the presence of the external input controller; determining, by the computing device, the presence of peripheral device; connecting, by the computing device, to the peripheral device; enabling, by the computing device, a second usage mode of the video game in response to connecting to the peripheral device; wherein the first usage mode allows the player to provide inputs to the video game using the external input controller; wherein the first usage mode disables the video game's touchscreen-based inputs; wherein the peripheral device is capable of reading information contained in physical toys relating to a virtual game character; wherein the second usage mode allows the player to control the virtual game character; and wherein the peripheral device comprises a storage compartment for the external input controller.

Another aspect of the invention relates to a method for executing a video game on a portable computing device, said portable computing device providing touchscreen-based inputs to the player, the method comprising: determining, by the computing device, whether an external input controller is connected to the computing device; determining, by the computing device, whether a peripheral device is connected to the computing device, the peripheral device configured to read information relating to virtual game characters contained in physical toys proximate the peripheral device, the peripheral device including a storage compartment for the external input controller; enabling, by the computing device, a first usage mode of the video game in response to determining that the external input controller and the peripheral device are connected to the computing device, the first usage mode providing for control of a first virtual character using the external input controller and disablement of the touchscreen-based inputs, the first virtual character relating to a first toy proximate the peripheral device; and enabling, by the computing device, a second usage mode of the video game in response to determining that the external input controller is connected to the computing device and the peripheral device is not connected to the computing device, the second usage mode providing for control of a second virtual character, different than the first virtual character, using the external input controller, and disablement of the touchscreen-based inputs.

Another aspect of the invention relates to a non-transitory compute device readable medium for a video game, the computer readable medium including program instructions for execution by the compute device, the program instructions including program instructions for: determining presence of a peripheral device configured to read virtual character information from and write virtual character information to a memory of a physical toy; determining presence of an external game controller; connecting of the compute device to the peripheral device; connecting of the compute device to the external game controller; and determining a usage mode for play of the video game based on whether the peripheral device is connected to the compute device and based on whether the peripheral device is connected to the compute device and based on whether the external game controller is connected to the compute device, the usage mode being one of a plurality of at least first, second, third, and fourth usage modes; wherein in the first usage mode video game play is provided in which a player controls a first virtual character using the external game controller; wherein in the second usage mode video game play is provided in which the player controls a second virtual character using the external game controller; wherein in the third usage mode video game play is provided in which the player controls the first virtual character using touchscreen-based inputs of the compute device; and wherein in the fourth usage mode video game play is provided in which the player controls the second virtual character using the touchscreen-based inputs of the compute device.

These and other aspects of the invention are more fully comprehended upon review of this disclosure.

DETAILED DESCRIPTION

Figure 1:
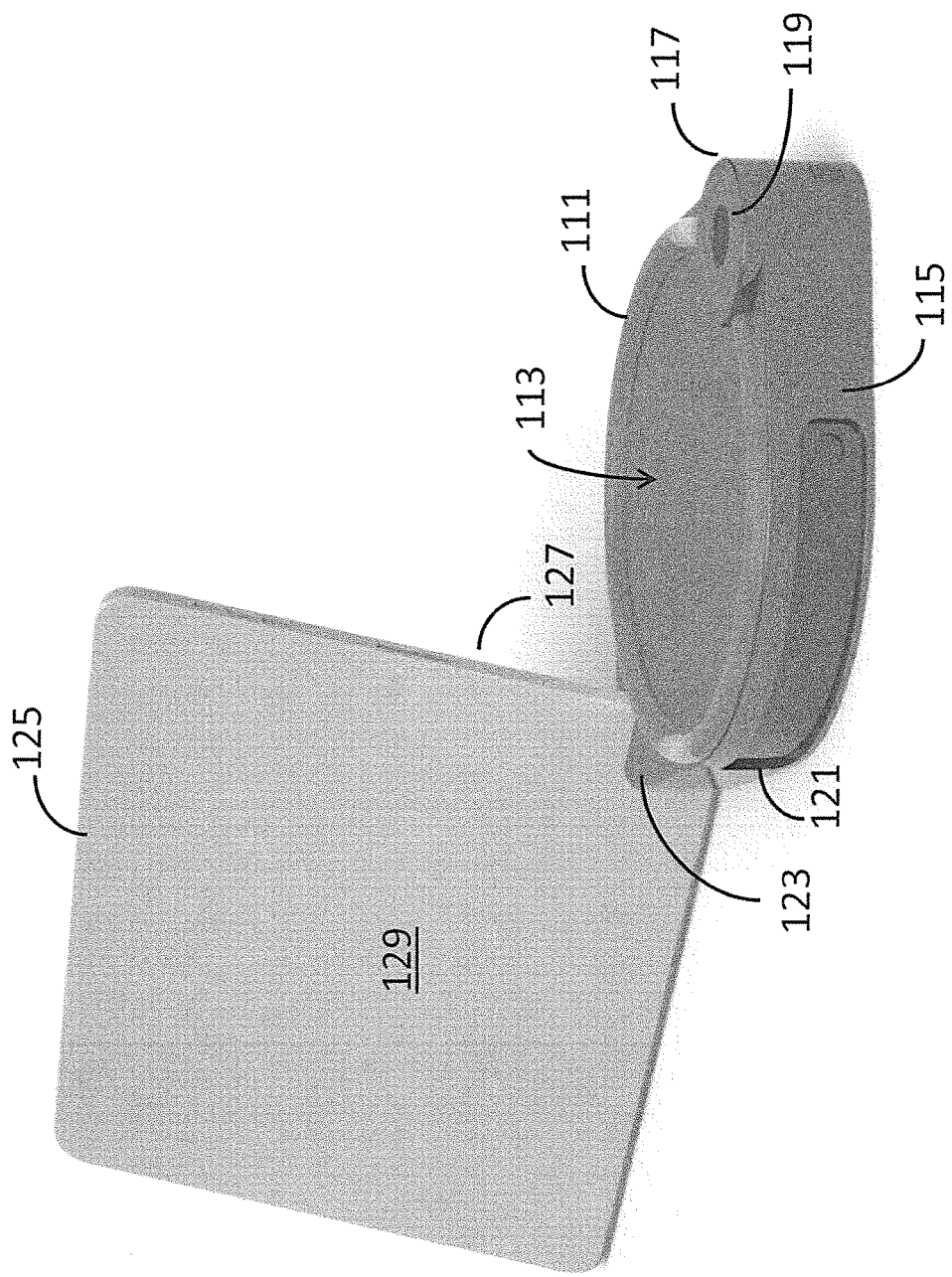
FIG. 1 illustrates a system including a peripheral device in accordance with aspects of the invention and a computer tablet, the peripheral device supporting the computer tablet for use in gameplay.

FIG. 1 illustrates a system including a peripheral device 111 in accordance with aspects of the invention, with the peripheral device supporting a computer tablet 125 having a touchscreen display 129. The peripheral device is useful in playing video games played on the computer tablet, for example video games in which a player controls a video game character representative of a toy placed by the player on the peripheral device. In such video games, the toy may include computer readable information identifying the toy, and possibly characteristics of the video game character representative of the toy, and the peripheral device may read such information and provide the information to the computer tablet, for example by way of wireless communications such as Bluetooth or Bluetooth Low Energy communications, for use in gameplay. In some embodiments characteristics of the video game character may change during gameplay, and the peripheral device may receive the changed information and write the changed information to memory of the toy. In addition, although a computer tablet is illustrated in the system of FIG. 1, in various embodiments other computer devices, for example a smartphone, smart television, or video game console, may be used.

The peripheral device is in the form of a housing including a substantially flat upper surface 113, coupled by a side wall 115 to a bottom surface (not visible in FIG. 1). The upper surface, or top, of the peripheral device generally includes a region for placement of toys used in gameplay. The bottom surface is generally configured for placement on a flat surface, for example a table top or floor, with the bottom surface providing a base for the peripheral device. As illustrated in FIG. 1, the peripheral device is substantially cylindrical in shape, although in various embodiments the peripheral device may have other shapes, for example ring shaped, parallelepiped, have a conical cross-section, or have a hexagonal cross-section, or have a form of a cross, star or other shape, and the housing may have a plurality of side walls.

The peripheral device includes a protuberance 121 along its side, with the protuberance including a notch 123 receiving a portion of the computer tablet, the portion being along a side 127 of the computer tablet as illustrated in FIG. 1. In some embodiments the peripheral device may not include the protuberance, with the notch simply extending into the housing of the peripheral device. Also, in the embodiment of FIG. 1, the notch is canted with respect to a plane perpendicular to the top surface, with for example such a plane intersecting the notch to form an angle of fifteen degrees. In other embodiments the notch may be canted to a greater or lesser extent with the plane perpendicular to the top surface, and in some embodiments the notch may be perpendicular to the top surface.

In some embodiments the protuberance 121 may instead be two protuberances, with the two protuberances forming opposing walls of the notch. In addition, in some embodiments the protuberances may not for a notch, but instead simply provide opposing surfaces, between which the tablet computer may be placed. For example in some embodiments the protuberances may be in the form of a pair of digits, for example cylinders, or also form example tabs, extending from the housing, with the tabs spaced to receive the computer tablet therebetween. The tabs may extend from the housing each at the same height along the side wall of the housing, and spaced apart a distance so as to receive the portion of the computer tablet. Alternatively, the tabs may be at different heights, with for example one tab positioned higher along the housing than another tab, with increased horizontal space between the tabs to allow for canted positioning of the computer tablet.

In some embodiments the protuberance 121 may comprise or be coupled to a clamping mechanism (not shown) to secure the computer tablet therebetween. The claiming mechanism may be adjustable, lockable, and/or spring-loaded to allow for computer tablets of various widths. In some embodiments, the protuberance 121 may comprise padded components (not shown) which both allow for computer tablets of various widths and prevent unintentionally damage to the computer tablet from the protuberance.

In the embodiment of FIG. 1, a plane defined by a surface of the computer tablet, for example the touchscreen display 129, may be considered to generally vertically bisect the peripheral device, ignoring offsets from the vertical provided by the cant. Preferably a radial distance of the cylindrical housing, or corresponding distance if the housing is otherwise shaped, is sufficient such that a moment of inertia of the housing is sufficient to avoid toppling of the computer tablet when positioned in the notch. In this regard, in some embodiments the protuberance and/or the notch may have a position and/or orientation with respect to the housing such that the plane defined by the surface of the computer tablet does not bisect the housing. For example, in some embodiments, the plane defined by the surface of the computer tablet may be, in the view of FIG. 1, forward of a center of the housing. In some embodiments the peripheral may comprise a counterweight component (not shown) for counterbalancing the weight of the computer tablet.

In the embodiment of FIG. 1, the peripheral device also includes a second protuberance 117 on an opposite side of the protuberance 121. The second protuberance includes, in its top surface, a cavity 119, or trap, to receive a portion of physical objects, which also may be considered toys. The physical objects may include computer readable, and in some embodiments writable, memory for storing information of game characters.

Figure 2:
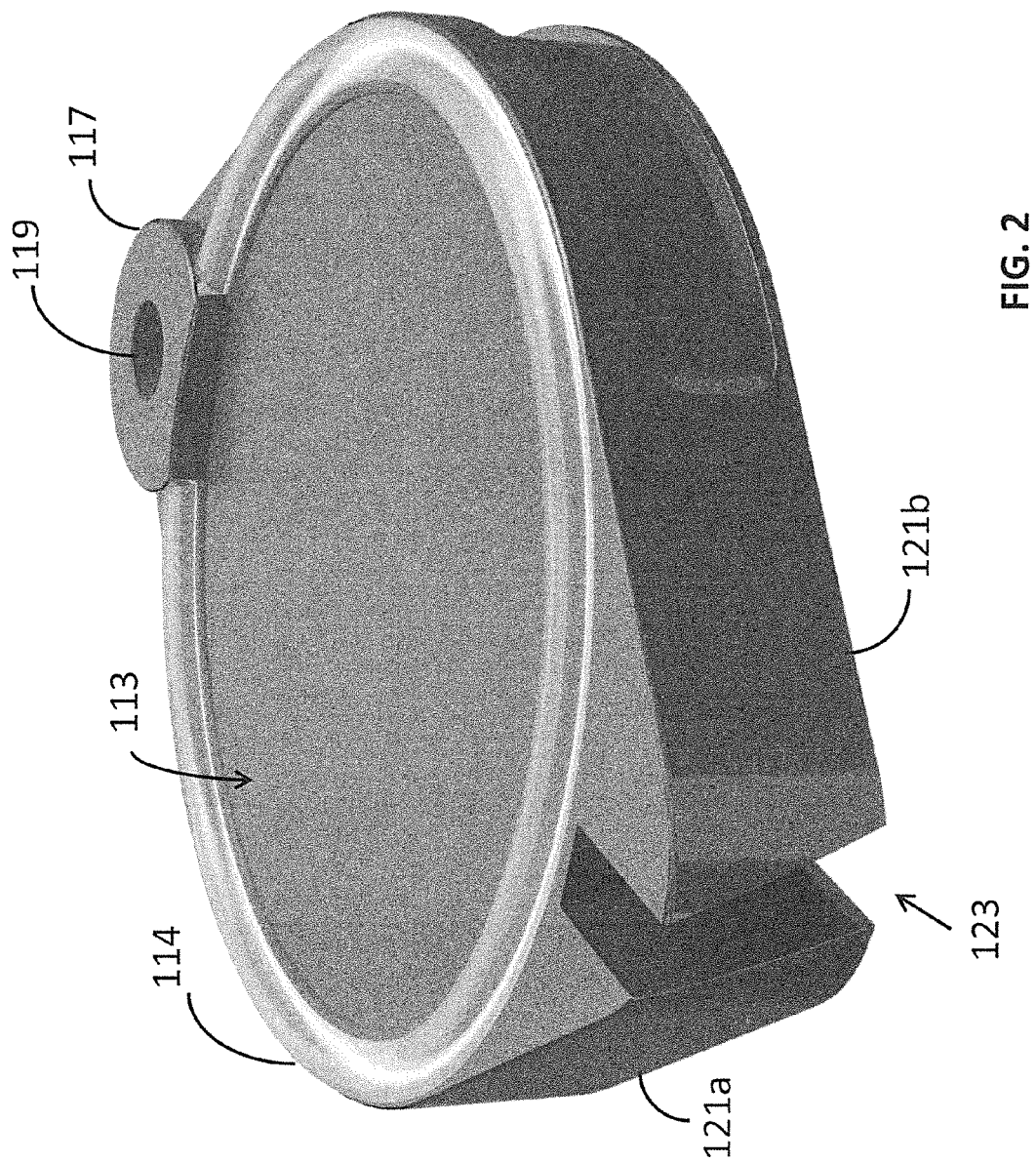
FIG. 2 illustrates a further view of the peripheral device of FIG. 1.

FIG. 2 illustrates a further view of the peripheral device of FIG. 1. As may be seen in FIG. 2, the peripheral device includes the generally flat upper surface 113 for placement of toys during game play. As may be seen in FIG. 2, the upper surface 113 is bounded by a rim 114. In various embodiments the housing of the peripheral device may be generally opaque to light, but with the rim 114, and possibly some other portions, non-opaque to light. For example, in some embodiments the rim may be translucent. Also as may be seen in FIG. 2, the second protuberance 117 includes a raised lip surrounding the trap 119.

More particularly with respect to FIG. 2, it may be seen that the protuberance 121 of FIG. 1 includes a first portion 121a and a second portion 121b, each of which may also be considered separate protuberances. The first and second portions separated by the notch 123. In the embodiment illustrated in FIG. 2, the notch extends into the housing, has generally parallel, and largely vertical, side walls coupled by a largely vertical base, and is canted with respect to a plane perpendicular to the upper surface. A width of the notch is sufficient to receive an edge of the tablet computer, preferably in a snug fashion such that operation of the touchscreen of the tablet computer does not cause excessive movement of the tablet computer, for example movement sufficient to interfere with normal user engagement with the touchscreen.

Figure 3:
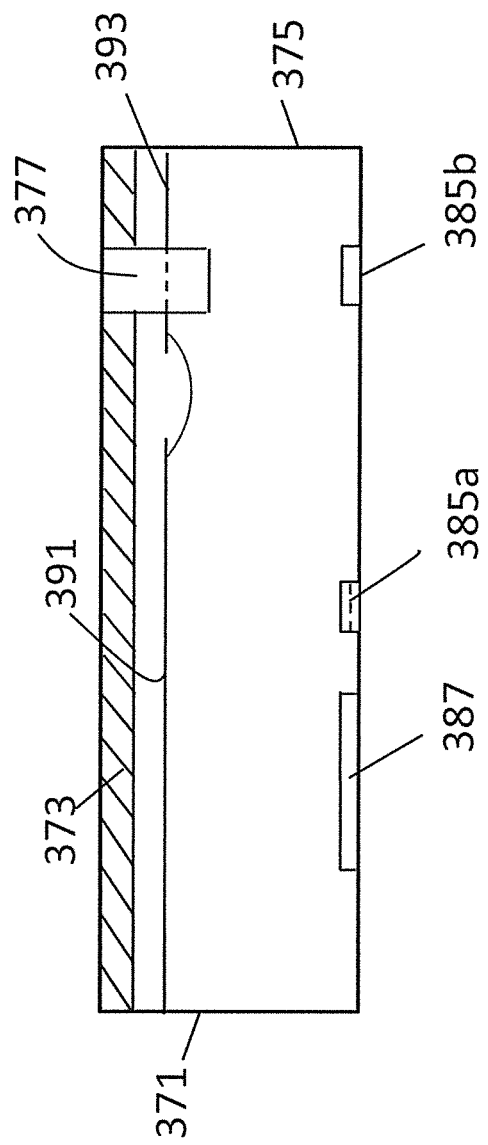
FIG. 3 is a cut-away side view of a peripheral device in accordance with aspects of the invention.

FIG. 3 illustrates a form of a cut-away side view of a peripheral device in accordance with aspects of the invention. The peripheral device includes a first end 371 and a second end 375. Generally a notched portion is provided about the first end, although the notched portion is not visible in FIG. 3. In some embodiments, the peripheral device includes a substantially flat top 373 for placement of toys thereon, with a trap 377 extending inward into the peripheral device from the top 373. As illustrated in FIG. 3, the trap is proximate the second end 375. A first antenna 391 is under, and proximate, the flat top, with the antenna positioned so as to be able to wirelessly communicatively link the peripheral device and toys with appropriate electronics on the flat top. A second antenna 393 is placed about the trap 377, so as to be able to wirelessly communicatively link a game piece, with appropriate electronics, at least partially inserted into the trap, with the peripheral device. The antennas are coupled by wires to a circuit board 387 within the peripheral device. The wires may, for example, be routed along sidewalls of the peripheral device, or alternatively the circuit board may be mounted proximate the flat top (and within the peripheral device). The circuit board provides for communications functions and other functions. In the embodiment of FIG. 3, the second antenna is linked by a wire, or other electrically conducting item, to the first antenna, which in turn is electrically coupled to the circuit board. In other embodiments the reverse is true, and in some embodiments both antennas are individually electrically coupled to the circuit board. In some embodiments, the surface for placing toys may be at the base or a mid-portion of the peripheral. In some embodiments, no surface may be present, and the region for placing toys may be spatially delineated, for example, the area encircled by the sidewalls of the peripheral.

The peripheral device also includes light sources 385a,b, for example LED light sources, within the peripheral device. The light sources may be driven by electronics of the circuit board. In the embodiment of FIG. 3, one light source is shown as positioned under the flat surface, and a second light source is shown positioned under the trap, for example so as to be able to illuminate a lower portion of a game piece within the trap. Accordingly, a bottom surface of the trap is translucent, in some embodiments, or the trap may have no bottom surface at all, allowing for passage of light into the game piece. In some embodiments the top of the peripheral device, or portions thereof, may be translucent to light, allowing for visual effects from the peripheral and/or passage of light to the game piece, even in embodiments in which the bottom of the trap is not translucent. In some embodiments, a speaker for generating audio may also be within the peripheral device. The speaker may be driven, for example, by electronics of the circuit board.

Figure 4:
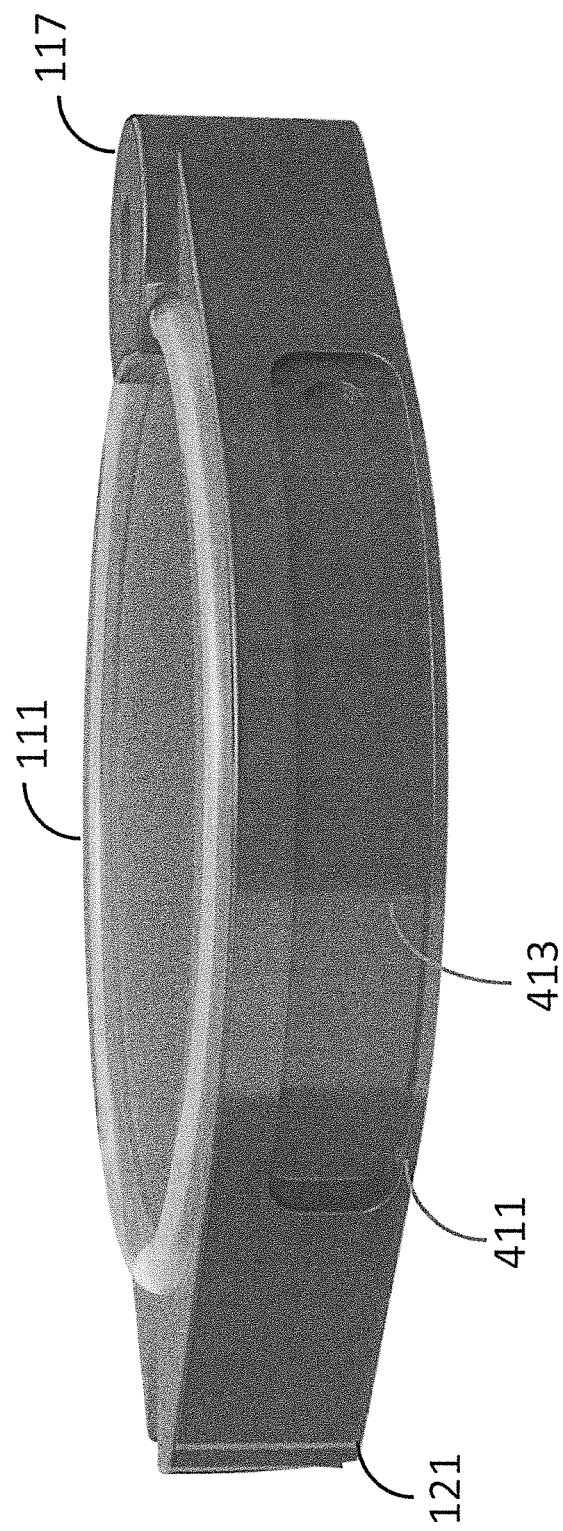
FIG. 4 illustrates a further view of the peripheral device of FIG. 1.

FIG. 4 illustrates a further view of the peripheral device 111 of FIG. 1, with the view of FIG. 4 being what may be considered a semi-front view of the peripheral device. As may be seen in FIG. 4, an aperture 411 is provided in the side wall of the housing of the peripheral device, between the protuberance 121 and the second protuberance 117. A door 413 blocks access to an interior of the housing through the aperture in the side wall. In the embodiment of FIG. 4, the door is shown within the housing, but in various embodiments the door may be flush with the side wall, or exterior to the side wall and aperture.

Figure 5:
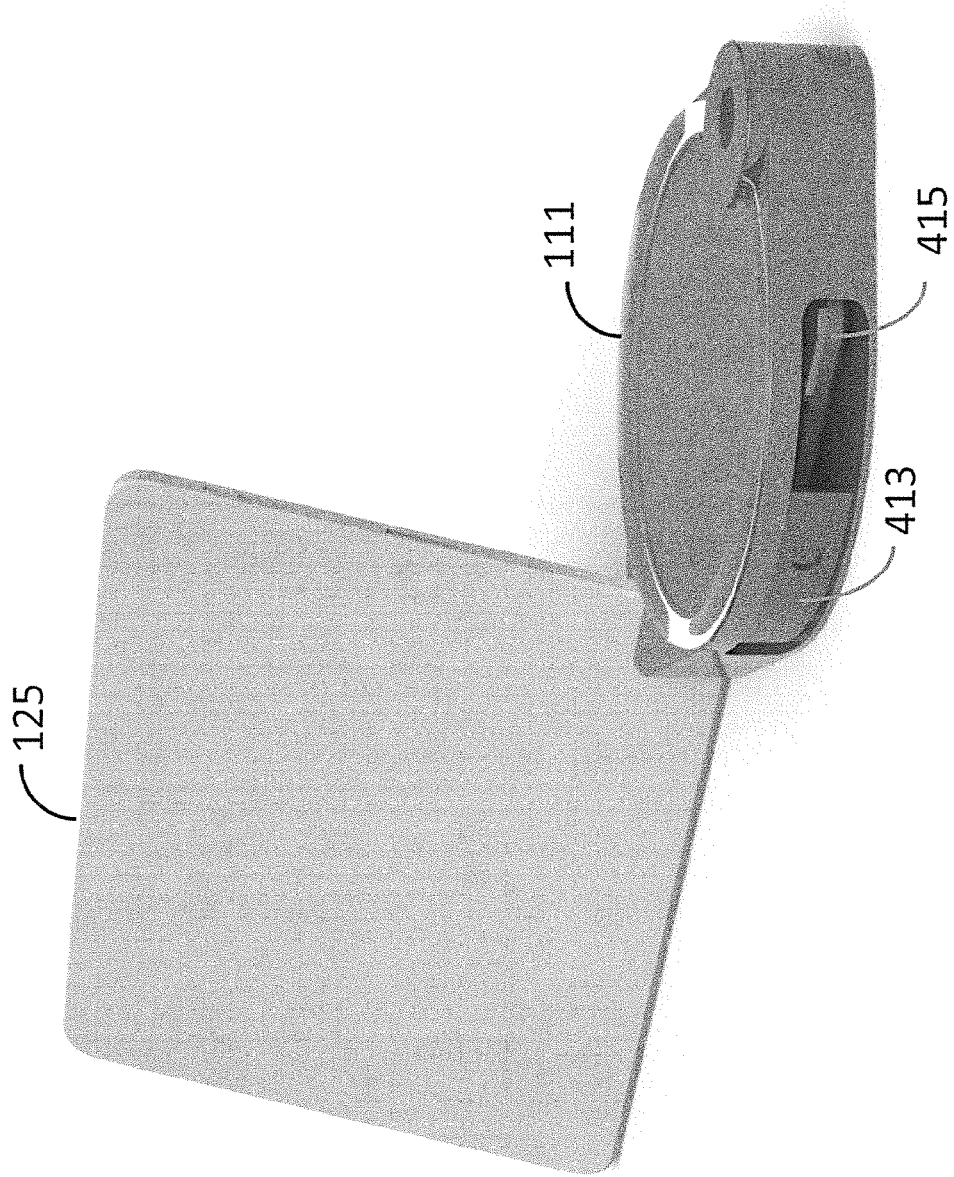
FIG. 5 illustrates the system of FIG. 1, with a door to a storage compartment of the peripheral device partially open, and a game controller stowed within the storage compartment.

FIG. 5 illustrates the peripheral device 111 of FIG. 1, with the tablet computer 125 positioned in the notch, and with the door 413 in a partially open position. With the door in the partially open position, a game controller 415 may be seen as stored within the housing of the peripheral device. The game controller may be so stored, for example, in a storage compartment of the peripheral device, which may be separated by internal walls from circuitry also within the peripheral device. In some embodiments, the peripheral device and the game controller may comprise complementary magnetic elements (i.e., one or more magnets in the peripheral device having corresponding magnets in the game controller with opposite polarities) such that the game controller is magnetically attached to the peripheral device when stored with the peripheral device's housing. In some embodiments, the peripheral device may comprise a clamping or locking mechanism for retaining the game controller.

Figure 6:
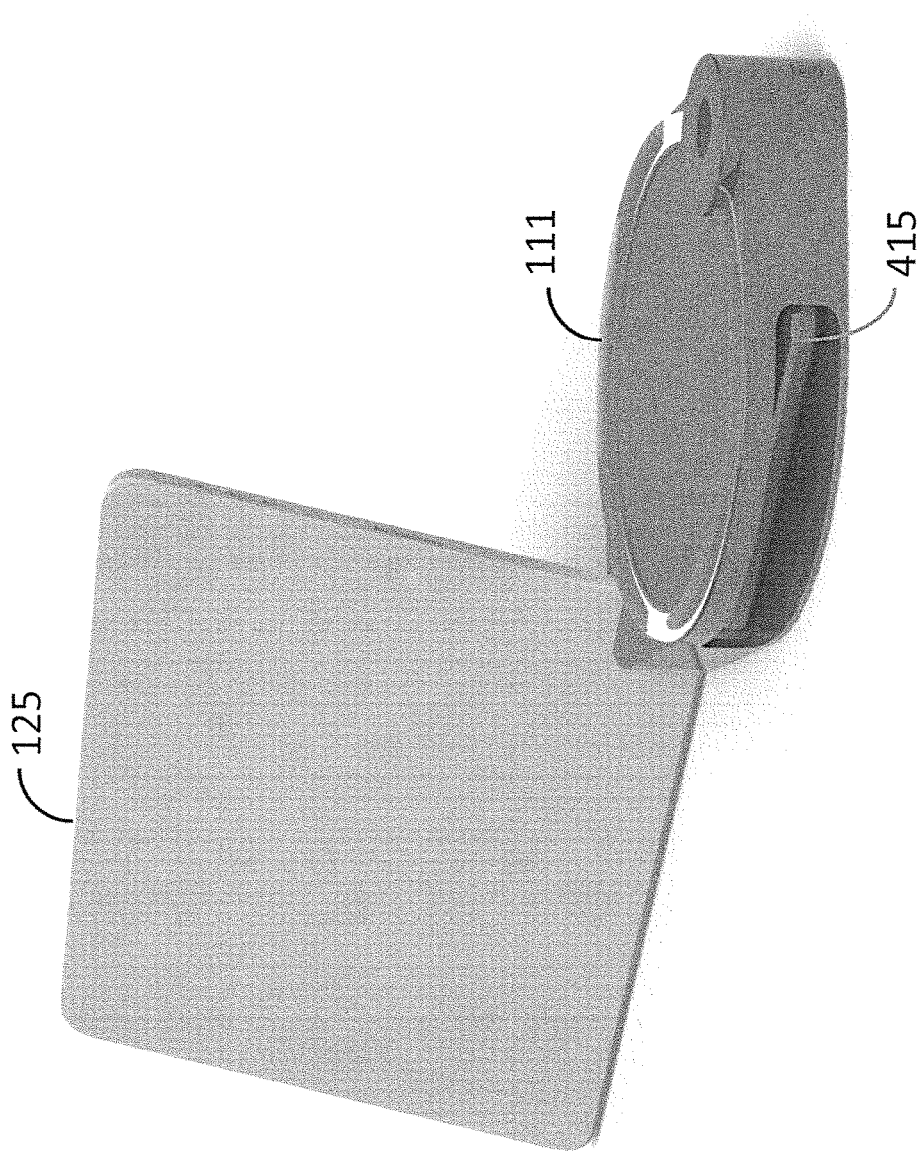
FIG. 6 illustrates the system of FIG. 5, with the door to the storage compartment in an open position.

FIG. 6 illustrates the view of FIG. 5, but with the door in a fully open position. As may be seen in FIG. 6, the computer tablet 125 is positioned in the notch of the peripheral device 111, and the game controller 415 is stored within the peripheral device. The door is not visible in FIG. 6, with the door being a sliding door that slides along the interior of the side wall of the housing. In various embodiments the door instead may be hinged to the side wall, with the door for example opening outward, or the door may be removable from the side wall altogether, with the door normally held in place with clips or the like. In some embodiments, the peripheral device does not comprise a door, and the storage compartment may be left open.

Figure 7:
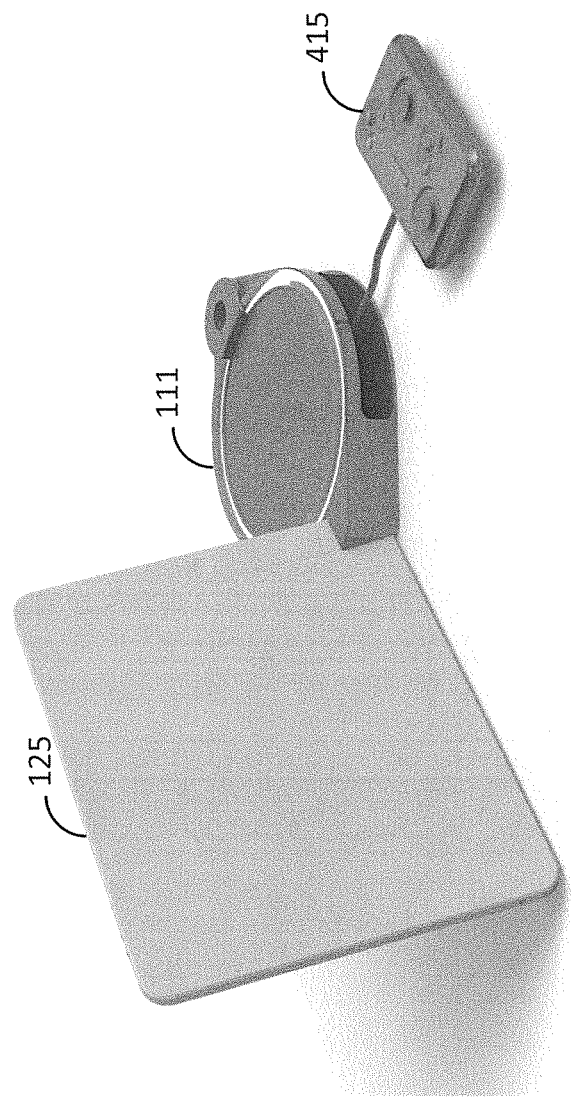
FIG. 7 illustrates the system of FIG. 6, with the game controller removed from the storage compartment.

FIG. 7 also illustrates the game controller 415 removed from the peripheral device 111, ready for use during gameplay. During gameplay a player may control a game character using the game controller, and may do so using both hands, while the tablet computer 125 is held, in a viewable position, in the notch of the peripheral device. Also as illustrated in FIG. 7, the game controller is coupled to the peripheral device by a cord. In some embodiments the cord is simply to securely link the game controller to the peripheral device, to help avoid loss of the game controller. In other embodiments, the cord may include electrical wiring, allowing for electrical communication of signals and/or power between the game controller and the peripheral device. In such embodiments, the peripheral device may communicate game controller signals to the computer device (e.g., tablet, smart phone, smart television, etc.).

Figure 8:
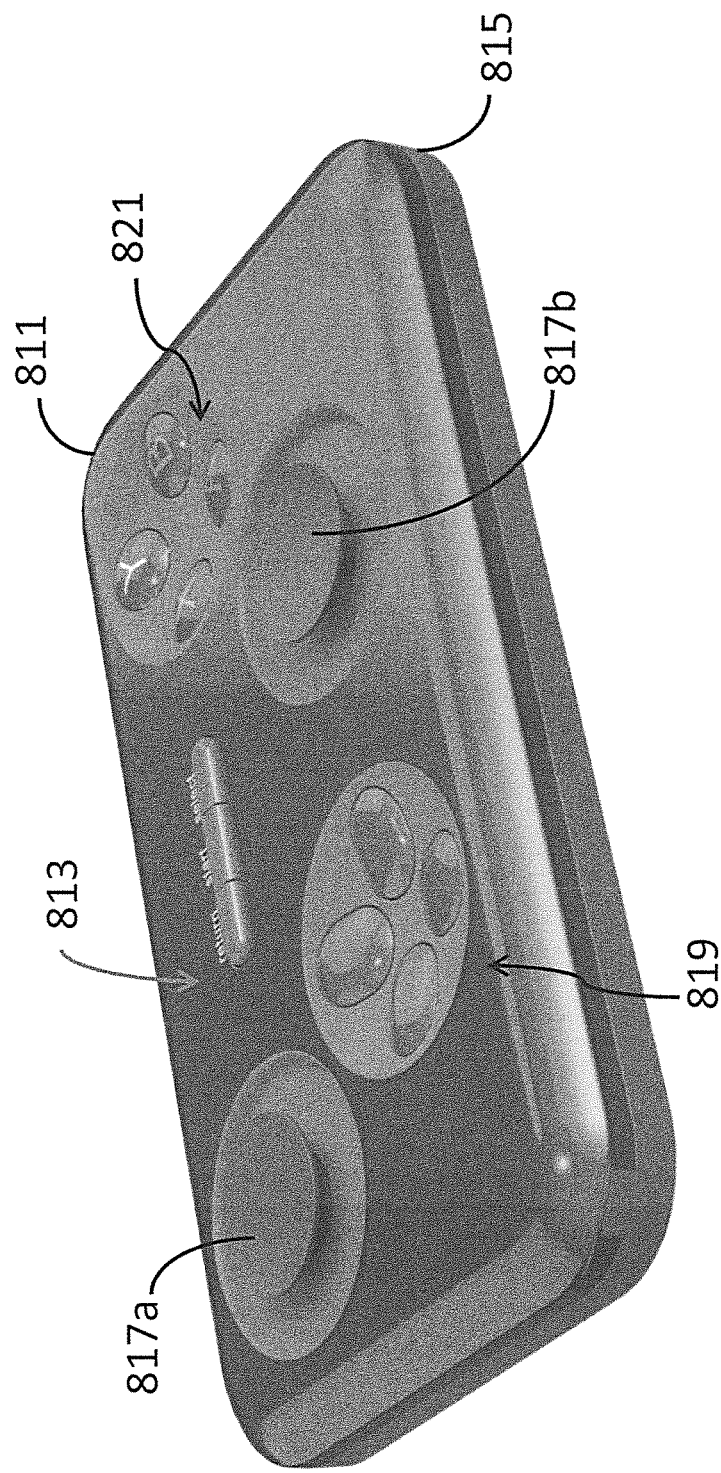
FIG. 8 illustrates an embodiment of a game controller.

FIG. 8 illustrates a top perspective view of a game controller in accordance with, or useful with, aspects of the invention. The game controller includes a base 811. The base is formed of a housing with a top wall 813 and a bottom wall (not visible in FIG. 8) coupled by side walls 815. The game controller is generally dimensioned to fit within a peripheral device, and preferably removable through a doorway or other opening of the peripheral device. In some embodiments the base is substantially dimensioned to be similar in size and shape to a smartphone or other handheld display device. In some embodiments, the game controller comprises magnetic elements (not shown) that pair to magnetic elements within the peripheral device.

A plurality of user input devices extend through the top wall of the base. In the embodiment illustrated in FIG. 8, the input devices include a pair of analog sticks 817a,b, a plurality of game pad buttons 819, and a plurality of directional buttons 821. The input devices are coupled to circuitry within the base. In some embodiments a battery or other power source may be within the base as well. In most embodiments the circuitry within the base communicates information as to the state of the input devices to a computer tablet, smartphone, or other computer device executing a game program. In some embodiments, the game controller includes wireless communication circuitry for communicating with the computer tablet, smartphone, or other computer device, for example using Bluetooth or Bluetooth Low Energy components. In some embodiments the game controller is connected by a wire (not shown in FIG. 8) to the peripheral device. In some embodiments the game controller is tethered to the peripheral device by cord, cable, or the wire. In most embodiments the circuitry within the base communicates information as to the state of the input devices to a computer tablet, smartphone, or other computer device executing a game program.

Figure 9:
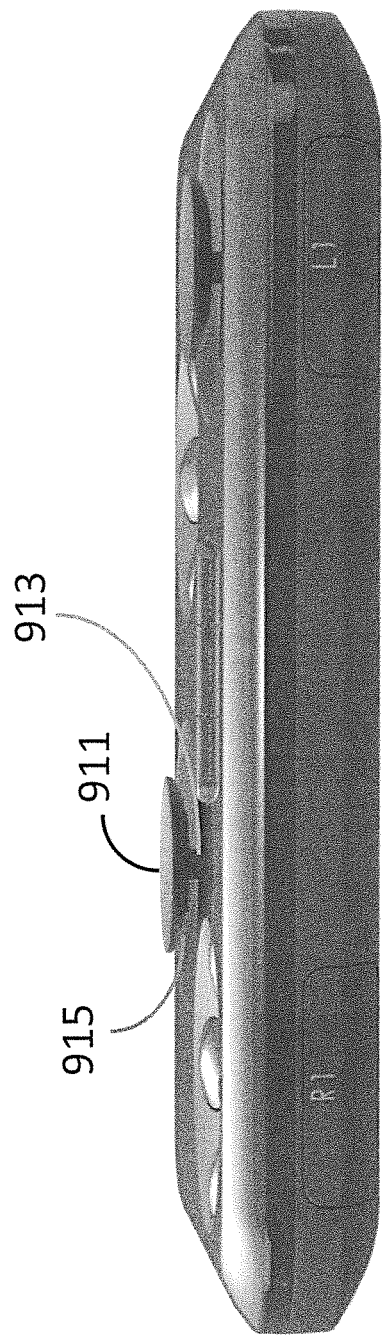
FIG. 9 illustrates a further view of the game controller of FIG. 8.

FIG. 9 illustrates an offset rear view of the game controller of FIG. 8. FIG. 9 shows an embodiment of shape of the analog sticks. For example, for simplicity discussing only analog stick 817b of FIG. 8, the analog stick includes a stem 915 extending from the top wall of the game controller to a lower convex surface 915, which is mirrored by an outwardly concave top 911. The concave top of the analog stick possibly may allow for increased user ease in operating the stick, with the shape of the stick as a whole allowing for decreased protrusion of the stick from the top wall of the game controller.

Figure 10:
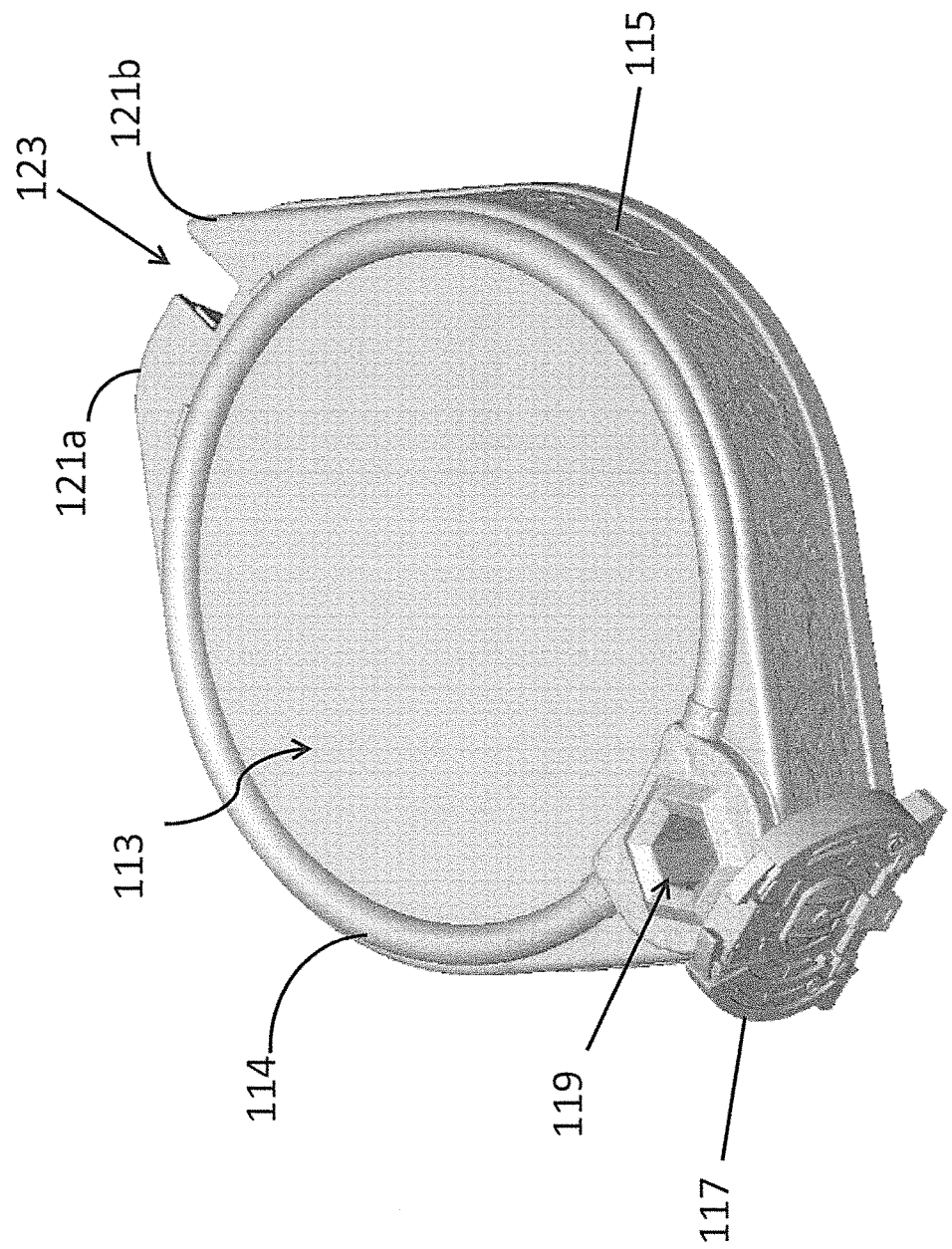
FIG. 10 illustrates a peripheral device in accordance with aspects of the present invention.
Figure 11:
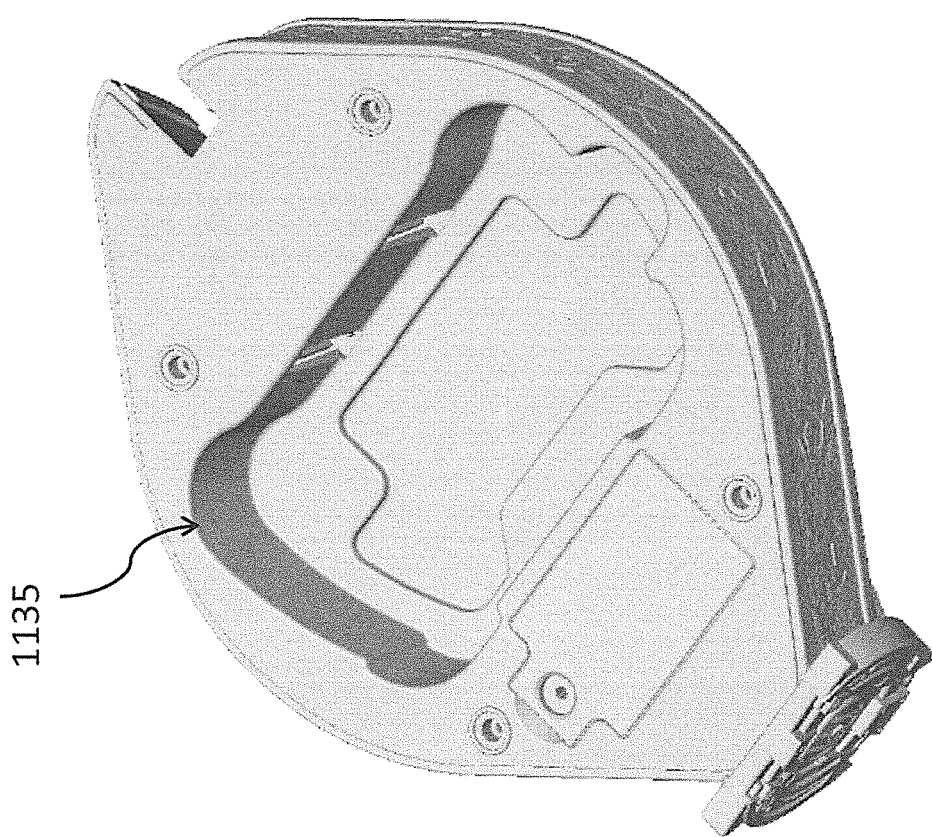
FIG. 11 illustrates a further view of the peripheral device depicted in FIG. 10.

FIGS. 10 and 11 depict another embodiment of the peripheral device disclosed herein. Common elements between the embodiment of FIG. 1 and the embodiment of FIGS. 10 and 11 share the same numerical designations. As shown, the embodiment of FIGS. 10 and 11 does not include an aperture in sidewall 115 for access to the storage compartment. Instead, as shown in FIG. 11, the peripheral device comprises a storage compartment that is accessed through an aperture 1135 in the bottom surface of the peripheral device. As with the embodiment of FIG. 1, the storage compartment may or may not be covered by a door or cover. Also as with the embodiment of FIG. 1, the peripheral device and/or the game controller may comprise magnetic, clamping, or fastening elements for securing the game controller within the storage compartment of the peripheral device.

Figure 12:
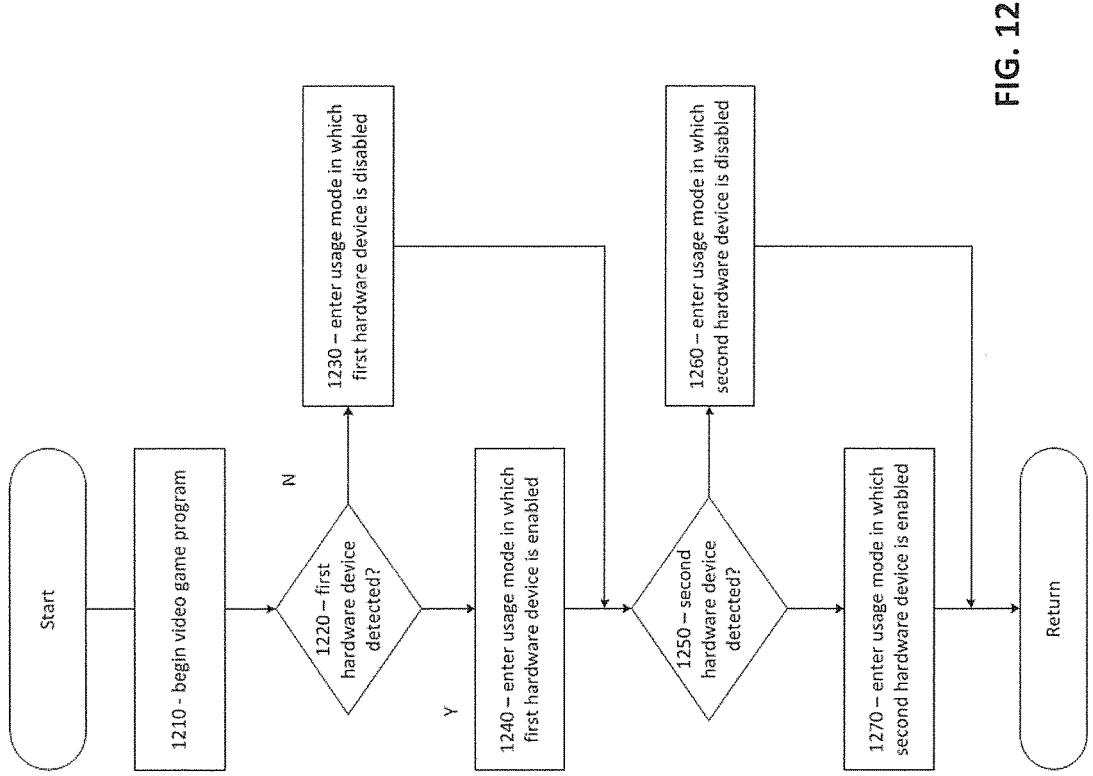
FIG. 12 illustrates a flow diagram of a process in accordance with aspects of the present invention.

FIG. 12 is a flow diagram of a process in accordance with aspects of the invention. The process of FIG. 12 may be performed, for example, by the systems and peripheral devices described in connection with FIGS. 1-11. In some embodiments the process is performed by a computing device. In some embodiments the process is performed by a computer tablet, and in some embodiments the process is performed by one or more processors of a computer tablet. The process of FIG. 12 allows a player using such systems and peripheral devices to dynamically switch between various usage modes and/or gameplay patterns based on the system's configuration.

For example, a system comprising a computer tablet with a native touchscreen input, an external input controller, and a peripheral device capable of reading information contained in physical toys relating to virtual game characters may be configured in a number of ways. In one configuration, the player may wish to utilize both the peripheral device for reading toy information and the external controller (as discussed above, the peripheral device and external controller may be integrated or parts of a set). In such a configuration, the process may, for example, disable the tablet computer's native touchscreen, and provide for control of a virtual character by way of use of the external input controller, all to provide a first usage mode, and enter a gameplay pattern in which physical toys can be used with the peripheral device to select the virtual character controlled by the player.

In an alternative system configuration, the player may wish to use only the tablet computer to play the video game, without use of the peripheral device or external input controller. In such a configuration, the process may, for example, enable control of the virtual character using touchscreen-based player controls, and ignore external input controller inputs (if present), all to provide a second usage mode, and enter a gameplay pattern that provides virtual characters that, in some embodiments, are not linked to physical toys or, in some embodiments, that are selected for control by the player without use of the peripheral device. Further yet, the player may wish to use the peripheral device in combination with the tablet computer's native touchscreen inputs. In such a configuration, the process may, for example, enable control of the virtual character using touchscreen-based controls, and ignore external input controller inputs (if present), all to enter a third usage mode, and enter a gameplay pattern in which physical toys can be used with the peripheral device to select the virtual character controlled by the player. Or the player may wish to use the external controller device without the peripheral device and physical toys. In such a configuration, the process may, for example, disable the tablet computer's native touchscreen, provide for control of the virtual character by way of use of the external input controller, all to enter a fourth usage mode, and enter a gameplay pattern that provides virtual characters that are not linked to physical toys. The process described herein provides for seamless switching between these various configurations and their associated gameplay patterns. In some embodiments, the switching may occur during a gameplay session. In some such embodiments the switching does not affect the identity of the virtual character being controlled by a player during the gameplay session, though in some embodiments, the identity of the virtual character being controlled by a player during the gameplay session changes.

In block 1210, the process begins execution of a video game program. In some embodiments, a computing device such as a tablet, smart phone, smart television, personal computer, or videogame console executes the video game program. The video game program may provide for video game play in which the player controls a video game character. In some embodiments the video game character is representative of a toy.

In block 1220, the process determines the presence of a first hardware device. In some embodiments, the first hardware device is an external input controller such as the game controller described in FIGS. 1-11 or some other external input controller such as a keyboard, mouse, joystick, etc. As discussed above in connection with FIGS. 1-11, the external input controller may be integrated with, or part of, a peripheral device. If the first hardware device is detected, the process proceeds to block 1240 and enters a usage mode in which the first hardware device is enabled and provides a gameplay pattern suitable for the first hardware device.

In some embodiments, the process detects the first hardware device when a user physically (e.g., using wires) connects the first hardware device to the computing device. Alternatively or additionally, the process may detect the first hardware device when the first hardware device is proximal to the computing device (e.g., using Bluetooth, Bluetooth Low Energy, or some other wireless protocol). Alternatively or additionally, the process may rely on the player to instruct the process, for example by way of a user input, that the first hardware device is connected. Further still, the process may rely on the physical arrangement of the system to determine the presence of the first hardware device, for example, when the computing device is placed in tablet-holding notch of the peripheral device described in connection with FIGS. 1-11.

In some embodiments, the process may further connect or pair the computing device to the first hardware device. For example, for implementations using a Bluetooth, Bluetooth Low Energy, or other short-range wireless protocol, pairing may be required to connect the first hardware device to the computing device. In some embodiments, this pairing may be performed by software or firmware without input or confirmation from the player. In some embodiments, a custom profile may be implemented such that the hardware device will only pair with software and/or firmware that is aware of the custom profile. Alternatively, the pairing may involve user input or confirmation. In some embodiments, the video game may provide the player with touchscreen-based player controls. In such embodiments, the process may remove the touchscreen-based player controls upon entering a usage mode utilizing the first hardware device. Additionally or alternatively, the process may disable the touchscreen altogether upon connecting the computing device and the first hardware device.

If the first hardware device is not detected, the process proceeds to block 1230 and enters a usage mode in which the computing device's native inputs are used and provides a gameplay pattern suitable for the computing device's native inputs. The native input controller may be, for example, a built-in touchscreen or a built-in keyboard or keypad. In some embodiments, the process may provide the player with touchscreen-based player controls.

Figure 13A:
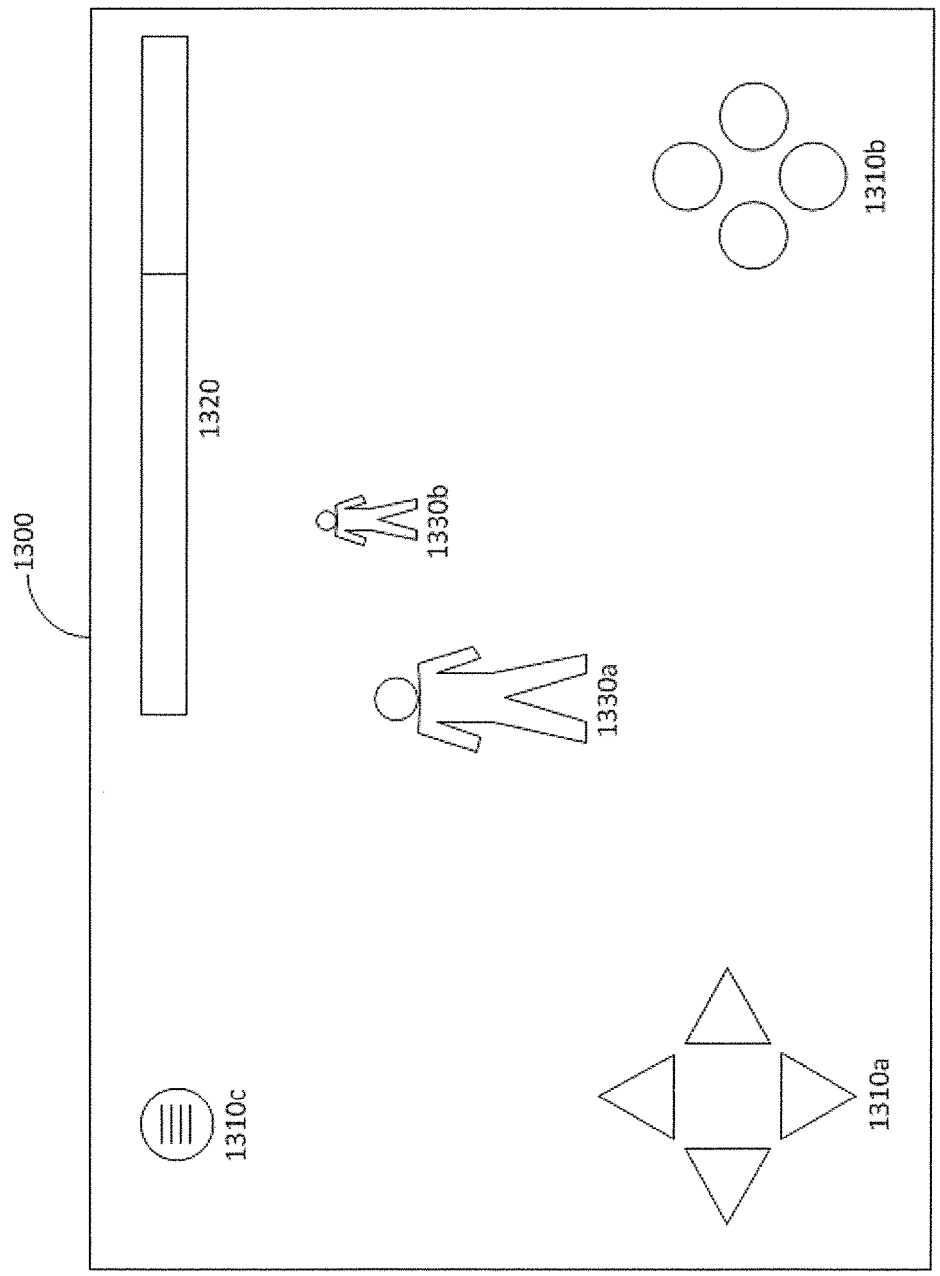
FIGS. 13A and 13B illustrate diagrams of a user interface in accordance with aspects of the present invention.
Figure 13B:
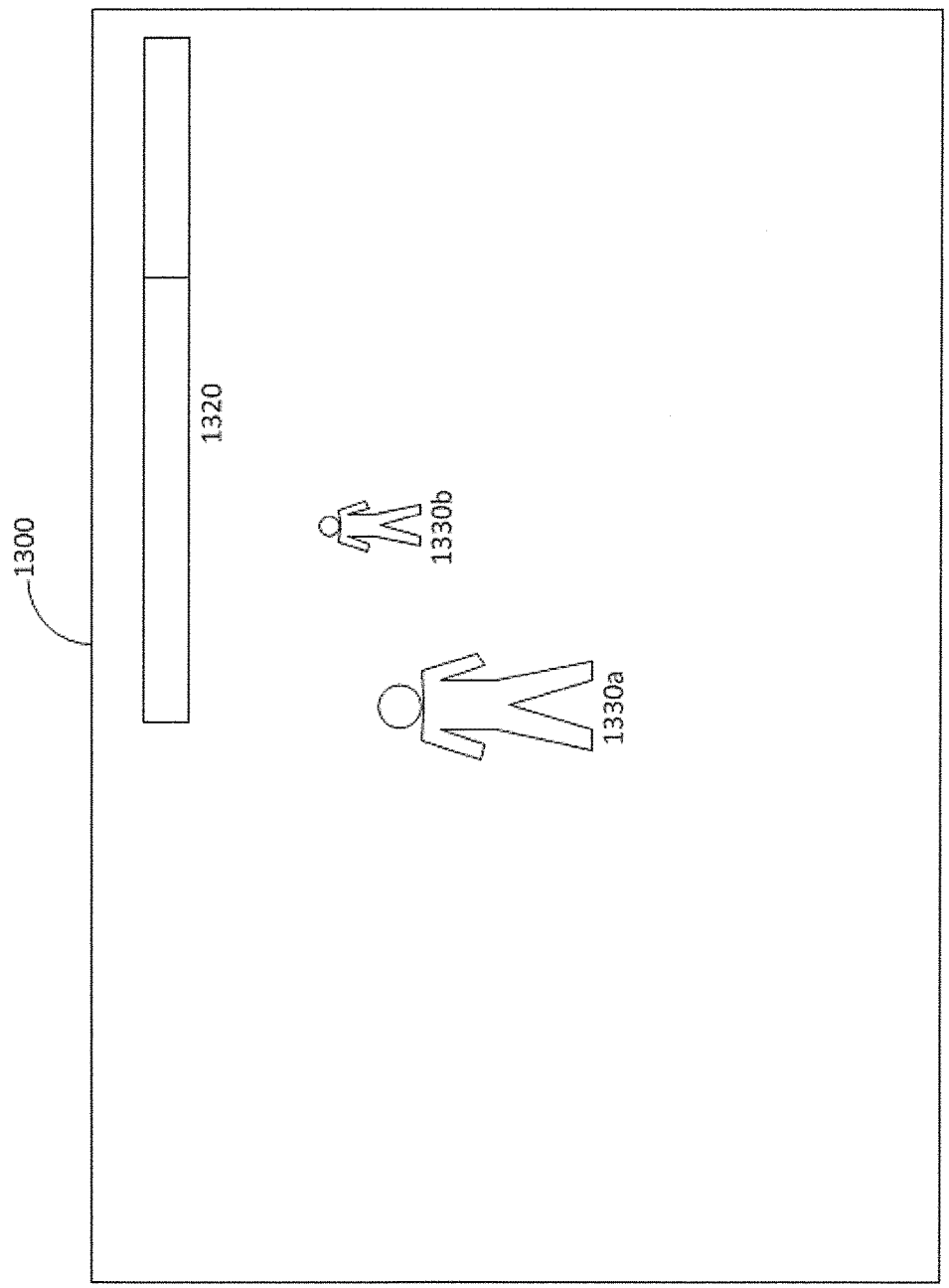

FIGS. 13A and 13B depict diagrams of a video game user interface in accordance with aspects of the invention. In FIG. 13A, user interface 1300 is in a usage mode in which the computing device's native input controller is used, in this example, a touchscreen. Touchscreen-based player controls 1310a and 1310b provide inputs for the player to control the video game, and touchscreen-based player control 1310c provides an input for the player to pause the game or bring up a menu. User interface 1300 may include other elements common to a video game such as, for example, one or more virtual characters 1330a and 1330b and health status bar 1320. Of course, these elements are merely exemplary and any number/type of elements may be present.

In FIG. 13B, user interface 1300 is in a usage mode in which the computing device has detected and connected to an additional hardware device (e.g., an external input controller). The user interface of FIG. 13B is generally identical to that of FIG. 13A, except the touchscreen-based player controls are no longer provided. In some embodiments, the native input controller (e.g., the touchscreen) may be disabled, in part or altogether. The user interface of FIG. 13B allows the player controls the video game using the detected hardware device. Although FIGS. 13A and 13B show a particular embodiment of a video game user interface, the present invention applies to any video game user interface, including those for gameplay, menus, tutorials, settings, etc.

As discussed above, the process of FIG. 12 detects the presence of a first hardware device, for example, an external input controller. In some embodiments, upon detection of (and/or connection/pairing to) the first hardware device, the video game software transitions between a usage mode using the native inputs and a usage mode using the detected hardware device. On the other hand, if the process no longer detects the hardware device, the process can return to the usage mode using the native inputs. The transitions between the usage modes may be seamless to the player, in some embodiments, or may require player selection and/or confirmation, in some embodiments, or may otherwise be accompanied by some notice to the player. For example, the process may display a dialogue prompting the player to confirm transitions between usage modes.

The process then proceeds to block 1250, in which the process determines the presence of a second hardware device. In some embodiments, the second hardware device may be the peripheral device of FIGS. 1-11. As discussed above, detection may occur in a number of ways, for example, by way of physical connection, wireless connection, player input, system arrangement, etc. If the second hardware device is detected, the process proceeds to block 1270 and enters a usage mode in which the second hardware device is enabled and provides a gameplay pattern suitable for the second hardware device. In embodiments where the second hardware device is the peripheral device of FIGS. 1-11, the gameplay pattern may be one in which physical toys placed on the peripheral device may affect the video game, for example, by allowing a player to control a video game character representative of the toy.

In some embodiments, the process may further connect or pair the computing device to the second hardware device.

For example, for implementations using a Bluetooth, Bluetooth Low Energy, or other short-range wireless protocol, pairing may be required to connect the first hardware device to the computing device. In some embodiments, this pairing may be performed by software or firmware without input or confirmation from the player. In some embodiments, a custom profile may be implemented such that the hardware device will only pair with software and/or firmware that is aware of the custom profile. Alternatively, the pairing may involve user input or confirmation.

If the second hardware device is not detected, the process proceeds to block 1260 and enters a usage mode in which the second hardware device is not enabled and provides a gameplay pattern that does not involve the second hardware device. For example, if the second hardware device is not detected, the process may provide a gameplay pattern in which the player controls one or more virtual characters without the need for providing a physical toy. In some embodiments, these virtual characters may be characters not linked to physical toys. Further, in some embodiments, these virtual characters may be unavailable to the player in the usage mode in which the peripheral device is detected. As discussed above, the transitions between the usage modes may be seamless to the player or may require player confirmation or may otherwise be accompanied by some notice to the player. For example, the process may display a dialogue prompting the player to confirm transitions between usage modes.

The process then repeats until the video game program completes execution. Although the process of FIG. 12 was described with respect to two hardware devices, the number of devices is merely exemplary and in other embodiments may vary.

The invention describes a system and peripheral devices for playing video games that allows the player to dynamically switch between various usage modes and/or gameplay patterns based on the system's configuration. Although the invention has been discussed with respect to various embodiments, it should be recognized that the invention comprises the novel and non-obvious claims supported by this disclosure.

What is claimed is:

1. A method for executing a video game on a portable computing device, said portable computing device providing touchscreen-based inputs to the player, the method comprising:
    determining, by the computing device, whether an external input controller is connected to the computing device;
    determining, by the computing device, whether a peripheral device is connected to the computing device, the peripheral device configured to read information relating to virtual game characters contained in physical toys proximate the peripheral device, the peripheral device including a storage compartment for the external input controller;
    enabling, by the computing device, a first usage mode of the video game in response to determining that the external input controller and the peripheral device are connected to the computing device, the first usage mode providing for control of a first virtual character using the external input controller and disablement of the touchscreen-based inputs, the first virtual character linked to a first physical toy proximate the peripheral device; and
    enabling, by the computing device, a second usage mode of the video game in response to determining that the external input controller is connected to the computing device and the peripheral device is not connected to the computing device, the second usage mode providing for control of a second virtual character, the second virtual character different than the first virtual character and the second virtual character not linked to a physical toy, using the external input controller, and disablement of the touchscreen-based inputs.

2. The method of claim 1,
    wherein the second usage mode allows the player to control a plurality of virtual characters not controllable by the player in the first usage mode.

3. The method of claim 2, further comprising:
    determining, by the computing device, that the external input controller is not connected to the computing device;
    enabling, by the computing device, a third usage mode in response to determining that the external input controller in not connected to the computing device; and
    wherein the third usage mode allows the player to provide inputs to the video game using the video game's touchscreen-based inputs.

4. The method of claim 3, further comprising:
    displaying, by the computing device, a dialogue prompting the player to confirm enabling of the third usage mode.

5. The method of claim 1, wherein the peripheral device is wirelessly connected to the computing device.

6. The method of claim 1, wherein the external input controller is wirelessly connected to the computing device.

7. The method of claim 1, wherein the enabling of the first usage mode does not require player input.

8. The method of claim 1, wherein the enabling of the second usage mode does not require player input.

9. The method of claim 1, wherein the external input controller is a game controller.

10. The method of claim 1, further comprising:
    determining, by the computing device, presence of the external input controller; and
    connecting, by the computing device, to the external input controller.

11. The method of claim 1, further comprising:
    determining, by the computing device, presence of the peripheral device; and
    connecting, by the computing device, to the peripheral device.

12. A non-transitory compute device readable medium for a video game, the computer readable medium including program instructions for execution by the compute device, the program instructions including program instructions for:
    determining presence of a peripheral device configured to read virtual character information from and write virtual character information to a memory of a physical toy;
    determining presence of an external game controller;
    connecting of the compute device to the peripheral device;
    connecting of the compute device to the external game controller; and
    determining a usage mode for play of the video game based on whether the peripheral device is connected to the compute device and based on whether the external game controller is connected to the compute device, the usage mode being one of a plurality of at least a first, second, third, and fourth usage modes;
    wherein the first usage mode provides video game play in which a player controls a first virtual character, selected through use of the physical toy with the peripheral device, using the external game controller;

wherein the second usage mode provides video game play in which the player controls a second virtual character, not selectable through use of the physical toy with the peripheral device, using the external game controller;

wherein the third usage mode provides video game play in which the player controls the first virtual character using touchscreen-based inputs of the compute device; and wherein the fourth usage mode provides video game play in which the player controls the second virtual character using the touchscreen-based inputs of the compute device.

13. The compute device readable medium of claim 12, wherein the program instructions for connecting the compute device to the peripheral device include program instructions for connecting the compute device to the peripheral device when the peripheral device is determined to be present.

14. The compute device readable medium of claim 12, wherein the program instructions for connecting the compute device to the external game controller include program instructions for connecting the compute device to the external game controller when the external game controller is determined to be present.

15. The compute device readable medium of claim 12, wherein the first virtual character is based on the virtual character information in memory of the physical toy.

16. The compute device readable medium of claim 12, wherein the second virtual character is not based on the virtual character information in memory of the physical toy.

17. The compute device readable medium of claim 12, wherein the first virtual character is based on the virtual character information in memory of the physical toy and the second virtual character is not based on the virtual character information in memory of the physical toy.

* * * * *